(12) United States Patent
Tillman (10) Patent No.: US 11,547,922 B1
(45) Date of Patent: Jan. 10, 2023

(54) EXERCISE MACHINE HAVING INTEGRATED VIDEO GAMING SYSTEM

(71) Applicant: Martin Tillman, Capitol Heights, MD (US)

(72) Inventor: Martin Tillman, Capitol Heights, MD (US)

(*) Notice: Subject to any disclaimer, the term of this patent is extended or adjusted under 35 U.S.C. 154(b) by 93 days.

(21) Appl. No.: 17/170,990

(22) Filed: Feb. 9, 2021

(51) Int. Cl.
*A63B 71/06* (2006.01)
*A63B 22/06* (2006.01)

(52) U.S. Cl.
CPC ...... *A63B 71/0622* (2013.01); *A63B 22/0605* (2013.01); *A63B 2022/0641* (2013.01); *A63B 2071/0644* (2013.01)

(58) Field of Classification Search
CPC .. A63B 22/0605–2022/0658; A63B 2024/009; A63B 2071/0644
See application file for complete search history.

(56) References Cited

U.S. PATENT DOCUMENTS

| | | | |
|---|---|---|---|
| D255,348 S | 6/1980 | Ott | |
| 4,512,567 A | 4/1985 | Phillips | |
| 4,542,897 A | 9/1985 | Melton | |
| 4,709,917 A * | 12/1987 | Yang | A63B 22/0605 434/61 |
| 6,987,327 B1 | 1/2006 | Lucatero | |
| 7,022,048 B1 * | 4/2006 | Fernandez | A63B 22/0605 482/8 |
| 7,044,891 B1 * | 5/2006 | Rivera | A63B 21/0053 482/8 |
| 7,253,534 B2 | 8/2007 | Vasilovich | |
| 2004/0198561 A1 * | 10/2004 | Corbalis | A63B 22/0605 482/57 |
| 2005/0130741 A1 | 6/2005 | Pandian | |
| 2007/0042868 A1 * | 2/2007 | Fisher | G16H 20/30 482/902 |
| 2007/0123390 A1 * | 5/2007 | Mathis | A63B 22/0605 482/8 |
| 2009/0118099 A1 * | 5/2009 | Fisher | A63B 21/0052 482/5 |
| 2010/0022354 A1 * | 1/2010 | Fisher | A63B 71/0622 482/8 |
| 2010/0090475 A1 | 4/2010 | Tsai | |

(Continued)

FOREIGN PATENT DOCUMENTS

| | | | | |
|---|---|---|---|---|
| WO | 2005079524 | | 9/2005 | |
| WO | WO-2011002302 A2 * | | 1/2011 | A63B 21/0055 |

*Primary Examiner* — Jennifer Robertson
(74) *Attorney, Agent, or Firm* — Kyle A. Fletcher, Esq.

(57) ABSTRACT

The exercise machine having integrated video gaming system comprises a frame, a seat, pedals, a steering assembly, a display screen, and a controller. The exercise machine having integrated video gaming system may be a device adapted to be used by a user while exercising and may encourage the user to move in a manner that strengthens muscles, increases lung capacity, increases metabolism, or combinations thereof. The seat may be adapted for the user to sit upon while pedaling the pedals. The steering assembly may be adapted to be held and moved by the user while exercising. The display screen may be adapted to present still or moving images to the user while the user exercises. The display screen, the steering assembly, the pedals, or combinations thereof may be operable to interact with the controller as a gaming system.

17 Claims, 4 Drawing Sheets

(56) References Cited

U.S. PATENT DOCUMENTS

| | | | |
|---|---|---|---|
| 2011/0082009 A1* | 4/2011 | Ranky | A63B 71/0622 |
| | | | 482/8 |
| 2018/0104564 A1* | 4/2018 | Cardon | A63B 71/0622 |
| 2020/0206567 A1* | 7/2020 | Jung | A63B 23/0476 |

* cited by examiner

EXERCISE MACHINE HAVING INTEGRATED VIDEO GAMING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of exercise equipment and gaming systems, more specifically, an exercise machine having integrated video gaming system.

SUMMARY OF INVENTION

The exercise machine having integrated video gaming system comprises a frame, a seat, pedals, a steering assembly, a display screen, and a controller. The exercise machine having integrated video gaming system may be a device adapted to be used by a user while exercising and may encourage the user to move in a manner that strengthens muscles, increases lung capacity, increases metabolism, or combinations thereof. The seat may be adapted for the user to sit upon while pedaling the pedals. The steering assembly may be adapted to be held and moved by the user while exercising. The display screen may be adapted to present still or moving images to the user while the user exercises. The display screen, the steering assembly, the pedals, or combinations thereof may be operable to interact with the controller as a gaming system.

An object of the invention is to provide an exercise machine comprising pedals, a movable seat, and a steering wheel mounted on an articulated post.

Another object of the invention is to provide a controller that may be operable to convert the exercise machine into a gaming system.

A further object of the invention is to provide a display screen coupled to the center of the steering wheel.

Yet another object of the invention is to provide an air shock in a steering extension post to further enhance the physical movements possible during exercise routines.

These together with additional objects, features and advantages of the exercise machine having integrated video gaming system will be readily apparent to those of ordinary skill in the art upon reading the following detailed description of the presently preferred, but nonetheless illustrative, embodiments when taken in conjunction with the accompanying drawings.

In this respect, before explaining the current embodiments of the exercise machine having integrated video gaming system in detail, it is to be understood that the exercise machine having integrated video gaming system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the exercise machine having integrated video gaming system.

It is therefore important that the claims be regarded as including such equivalent construction insofar as they do not depart from the spirit and scope of the exercise machine having integrated video gaming system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
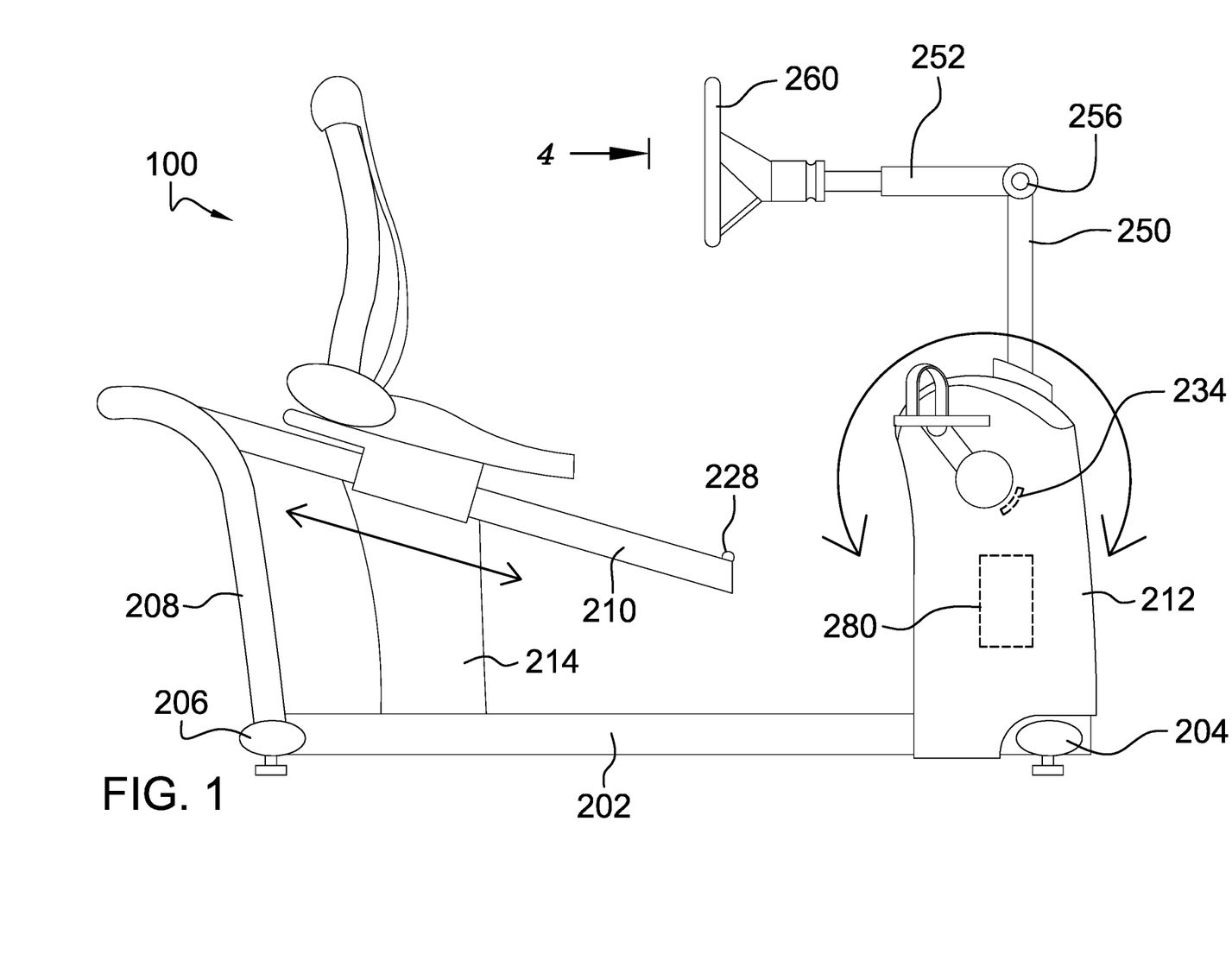
FIG. 1 is a right side view of an embodiment of the disclosure.
Figure 2:
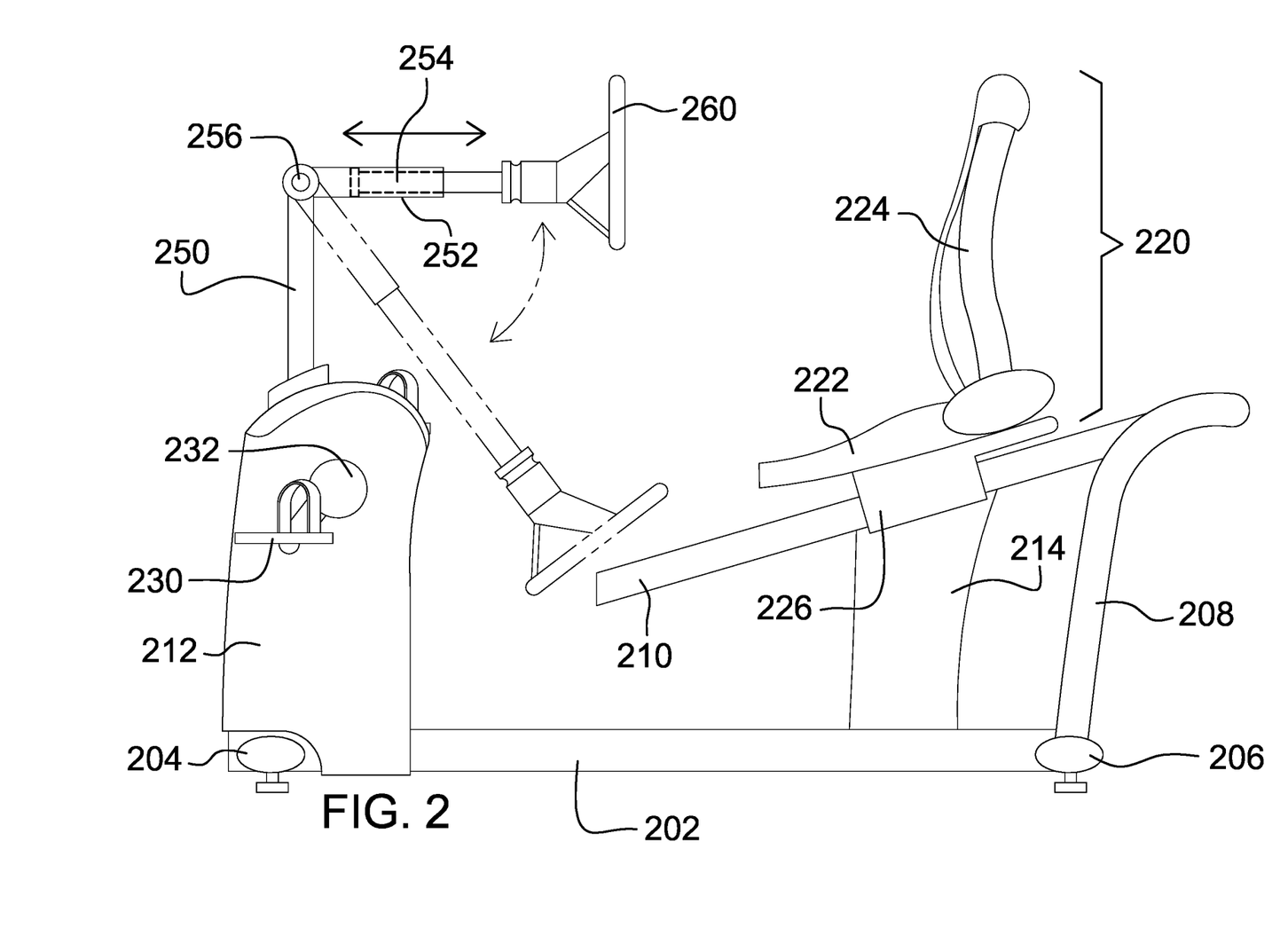
FIG. 2 is a left side view of an embodiment of the disclosure.
Figure 3:
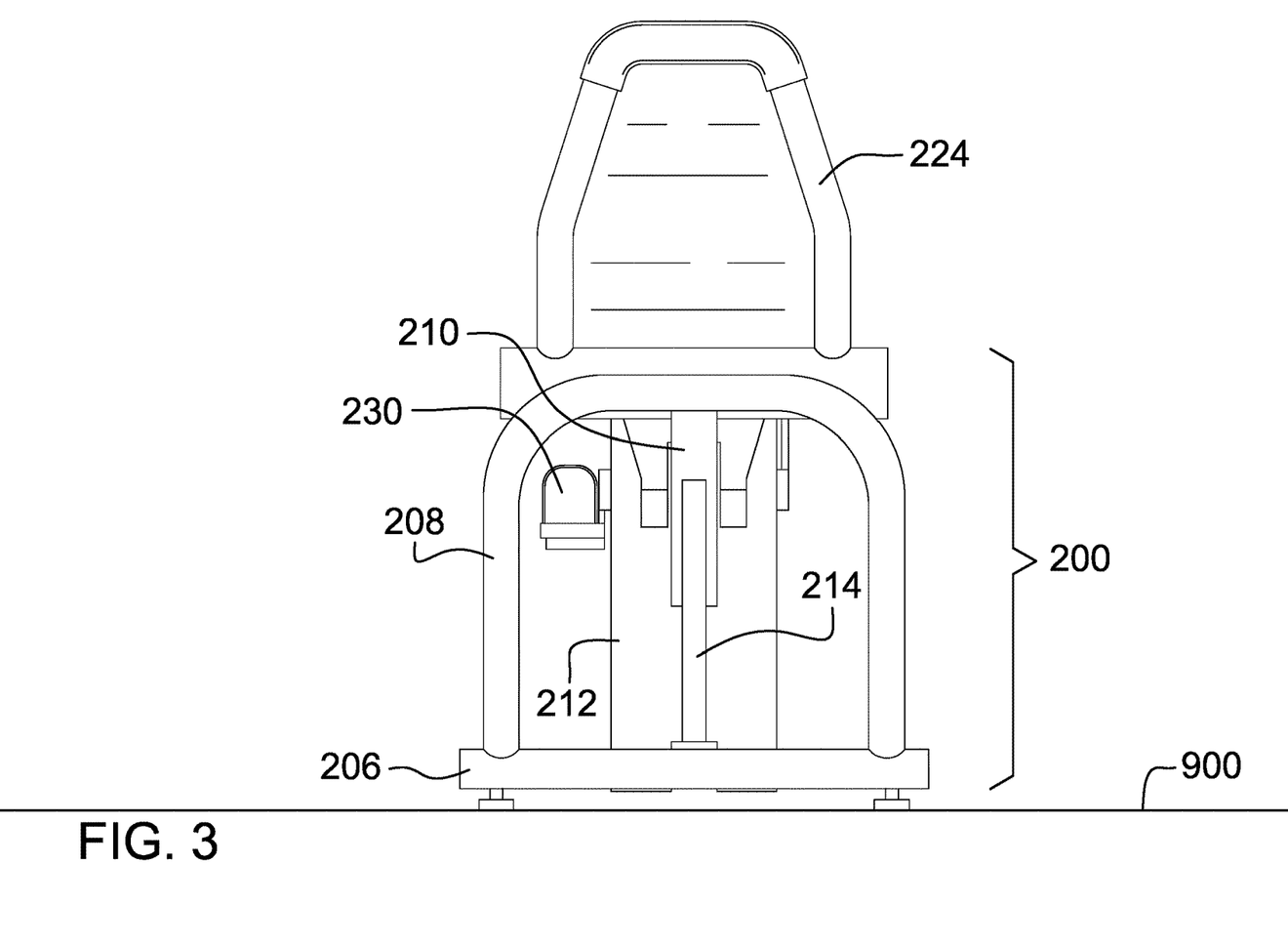
FIG. 3 is a rear view of an embodiment of the disclosure.
Figure 4:
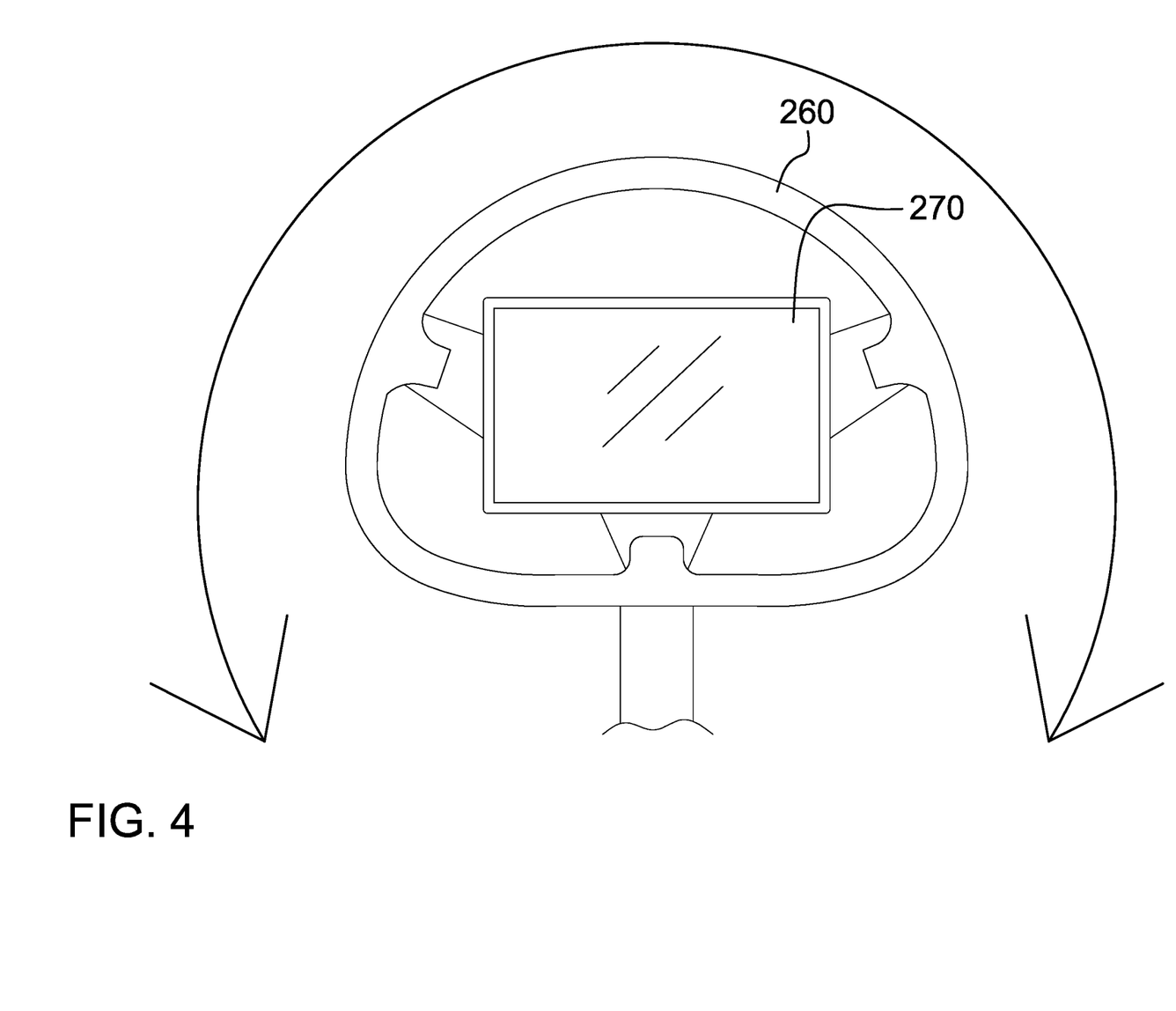
FIG. 4 is a detail view of an embodiment of the disclosure showing the area marked 4 in FIG. 1.

Detailed reference will now be made to a first potential embodiment of the disclosure, which is illustrated in FIGS. 1 through 4.

The exercise machine having integrated video gaming system 100 (hereinafter invention) comprises a frame 200, a seat 220, pedals 230, a steering assembly, a display screen 270, and a controller 280. The invention 100 may be a device adapted to be used by a user while exercising. The invention 100 may encourage the user to move in a manner that strengthens muscles, increases lung capacity, increases metabolism, or combinations thereof. The seat 220 may be adapted for the user to sit upon while pedaling the pedals 230. The steering assembly may be adapted to be held and moved by the user while exercising. The display screen 270 may be adapted to present still or moving images to the user while the user exercises. The display screen 270, the steering assembly, the pedals 230, or combinations thereof may be operable to interact with the controller 280 as a gaming system.

The frame 200 may comprise a longitudinal frame bracket 202, a front lateral frame bracket 204, a rear lateral frame bracket 206, a rear arch 208, a seat support 214, a seat track 210, and a front housing 212. The frame 200 may support the seat 220, the pedals 230, and the steering assembly. The longitudinal frame bracket 202 may be oriented to run from front to rear adjacent to a floor 900. The front lateral frame bracket 204 may be oriented to run laterally across the front of the frame 200 adjacent to the floor 900. The center of the front lateral frame bracket 204 may be coupled to the front of the longitudinal frame bracket 202. The rear lateral frame bracket 206 may be oriented to run laterally across the rear of the frame 200 adjacent to the floor 900. The center of the rear lateral frame bracket 206 may be coupled to the rear of the longitudinal frame bracket 202.

The rear arch 208 may be an armature in the shape of an inverted-U coupled to the rear lateral frame bracket 206 and rising vertically from the rear lateral frame bracket 206. The seat support 214 may be a vertical armature that may support the seat track 210. The bottom of the seat support 214 may be coupled to rear half of the longitudinal frame bracket 202.

The seat track 210 may be an inclined pathway for the seat 220 to follow. The rear of the seat track 210 may be coupled to the rear arch 208. A midpoint of the seat track 210 may be coupled to the top of the seat support 214. The rear of the seat track 210 may be higher than the front of the seat track 210.

The front housing 212 may cover mechanical components and the controller 280 to prevent injuries and to protect equipment. The front housing 212 may be located at the front of the frame 200 and may be coupled to the front lateral frame bracket 204, the longitudinal frame bracket 202, or both.

The seat 220 may be adapted for the user to sit on while exercising. The seat 220 may comprise a seat platform 222 and a seat back 224. The user may sit on the seat platform 222 and lean back against the seat back 224. The seat 220 may be slidably coupled to the seat track 210 via a seat carrier 226.

The seat carrier 226 may be coupled to the bottom of the seat 220. The seat carrier 226 may slidably couple to the seat track 210 such that the seat 220 may slide along the seat track 210 but is prevented from falling off of the seat track 210. In some embodiments, one or more track stops 228 may prevent the seat carrier 226 from moving past either end of the seat track 210.

The pedals 230 may be adapted to be foot-operated levers adjacent to the left and right of the front housing 212. The pedals 230 may be coupled to a crank arm 232 such that the pedals 230 may be moved in a circular manner. A brake 234 within the front housing 212 may resist the motion of the pedals 230. As non-limiting examples, the brake 234 may utilize mechanical friction or electromagnetic forces to resist the motion of the pedals 230. In some embodiments, the amount of resistance provided by the brake 234 may be variable and under control of the controller 280. The rotational position of the pedals 230 may also be sensed by the controller 280.

The steering assembly may comprise a vertical steering post 250, a steering extension post 252, an elbow joint 256, and a steering wheel 260. The steering assembly may be adapted to enhance upper body strength of the user while exercising.

The vertical steering post 250 may be a vertical armature located at the front of the frame 200. The vertical steering post 250 may rise to approximately the height of the chest of the seated user. The bottom of the vertical steering post 250 may be coupled to the front lateral frame bracket 204 or to the longitudinal frame bracket 202. The top of the vertical steering post 250 may comprise the elbow joint 256.

The steering extension post 252 may be a telescoping horizontal armature that is oriented to run from front to rear above the longitudinal frame bracket 202 of the frame 200. The front end of the steering extension post 252 may be coupled to the elbow joint 256. The rear of the steering extension post 252 may be coupled to the steering wheel 260. The elbow joint 256 may be operable to allow up and down pivoting of the steering extension post 252.

The steering extension post 252 may comprise an air shock 254. The air shock 254 may be a pneumatic shock absorber. The air shock 254 may allow the steering wheel 260 to be moved in a forward direction as a forward force is applied to the steering wheel 260 and may return the steering wheel 260 to the original rearward position when the force is diminished.

The steering wheel 260 may be a circular armature. The center of the steering wheel 260 may be pivotably coupled to the rear end of the steering extension post 252. The steering wheel 260 may be suspended in front of the user such that the user may turn the steering wheel 260 as though the user were driving a vehicle. In some embodiments, the rotational position of the steering wheel 260 may be sensed by the controller 280.

The display screen 270 may be a flat-screen video display located at the center of the steering wheel 260. The images presented on the display screen 270 may be sourced from the controller 280.

The controller 280 comprise a microprocessor and a memory. The memory may store instructions and data. The instructions may cause the microprocessor to control the sequence and timing of the brake 234, the display screen 270, sensing the rotational position of the steering wheel 260, or combinations thereof.

The instructions may control the sequence and timing of the invention 100 such that the invention 100 functions as the gaming system. As a non-limiting example, the controller 280 may present images on the display screen 270 showing full motion video of scenes on a road trip. The controller 280 may sense the rotational speed of the pedals 230 and may time the presentation of images on the display screen 270 to match the apparent speed of the invention 100 based upon the rotational speed of the pedals 230. The controller 280 may increase and decrease resistance to pedaling using the brake 234 such that the user experiences perceived uphill and downhill segments of the imagery road trip. The controller 280 may sense the position of the steering wheel 260 and may modify the images to represent perceived changes in direction.

In use, the user may sit on the seat 220, place their feet on the pedals 230, and grasp the steering wheel 260 with their hands. The user may exercise by pedaling the pedals 230, moving the seat 220 up and down the seat track 210, manipulating the steering assembly, or combinations thereof. Manipulating the steering assembly may refer to turning the steering wheel 260, pushing the steering wheel 260 against the steering extension post 252 to compress the air shock 254, or both. The controller 280 may cause the invention 100 to operate as a gaming system. As non-limiting examples, the controller 280 may present still or moving images on the display screen 270 located on the steering wheel 260, may increase and decrease resistance to pedaling, may track steering motions in reference to a virtual course shown on the display screen 270, and may compute and display a score based upon the user's ability to follow and complete the virtual course in minimal time.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "approximate" and "approximately" indicate that information that is being presented is not critical for proper functioning of the invention and that the information is being provided only to assist in a better understanding of some physical characteristic of an embodiment of the invention. As a non-limiting example, a device that is described as "cubical and approximately 1 inch long on each side" is not required to be precisely 1 inch long on each side and the reader may understand that the device will likely fit in their pocket.

As used in this disclosure, a "brake" may be a device that is used to slow or stop the motion of a machine or a vehicle.

In this disclosure, "compress" may refer to forcing into a smaller space.

As used herein, the words "couple", "couples", "coupled" or "coupling", may refer to connecting, either directly or indirectly, and does not necessarily imply a mechanical connection.

As used herein, the words "data" and "information" may be used interchangeably to refer to raw, unprocessed facts and to facts that have been processed, structured, organized, or presented in a context that makes the facts useful.

As used in this disclosure, a "display" may be a surface upon which is presented an image, potentially including, but not limited to, graphic images and text, that is interpretable by an individual viewing the image. When used as a verb, "display" may be defined as presenting such an image.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, a "housing" may be a rigid or semi-rigid casing that encloses and protects one or more devices.

As used herein, the words "invert", "inverted", or "inversion" refer to an object that has been turned inside out or upside down or to the act of turning an object inside out or upside down.

As used in this disclosure, the word "lateral" may refer to the sides of an object or movement towards a side. Lateral directions are generally perpendicular to longitudinal directions. "Laterally" may refer to movement in a lateral direction.

As used herein, the word "longitudinal" or "longitudinally" may refer to a lengthwise or longest direction.

As used here, the word "midpoint" may refer to a point that is between the ends of an object. An "exact midpoint" may refer to a midpoint that is equidistant from edges of the object in at least one direction. Unless otherwise stated, a midpoint is not required to be at the exact center of the object but instead may be within 50% of the distance from the exact midpoint to the farthest edge, farthest end, or farthest corner.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, "telescopic", "telescoping", and "telescopically" refer to an object made of sections that fit or slide into each other such that the object can be made longer or shorter by adjusting the relative positions of the sections.

As used in this disclosure, a "track" may be a device that is used to control the path of motion of an object in at least one dimension.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An exercise machine having integrated video gaming system comprising:
   a frame, a seat, pedals, a steering assembly, a display screen, and a controller;
   wherein the seat is adapted for a user to sit upon while pedaling the pedals;
   wherein the steering assembly is adapted to be held and moved by the user while exercising;
   wherein the display screen is adapted to present still or moving images to the user while the user exercises;
   wherein the display screen, the steering assembly, the pedals, or combinations thereof are operable to interact with the controller as a gaming system;
   wherein the frame comprises a longitudinal frame bracket, a front lateral frame bracket, a rear lateral frame bracket, a rear arch, a seat support, a seat track, and a front housing;
   wherein the frame supports the seat, the pedals, and the steering assembly;

wherein the longitudinal frame bracket is oriented to run from front to rear adjacent to a floor;
wherein the front lateral frame bracket is oriented to run laterally across the front of the frame adjacent to the floor;
wherein the center of the front lateral frame bracket is coupled to the front of the longitudinal frame bracket;
wherein the rear lateral frame bracket is oriented to run laterally across the rear of the frame adjacent to the floor;
wherein the center of the rear lateral frame bracket is coupled to the rear of the longitudinal frame bracket;
wherein the rear arch is an armature in the shape of an inverted-U coupled to the rear lateral frame bracket and rising vertically from the rear lateral frame bracket;
wherein the seat support is a vertical armature that supports the seat track;
wherein the bottom of the seat support is coupled to rear half of the longitudinal frame bracket.

2. The exercise machine having integrated video gaming system according to claim 1
wherein the seat track is an inclined pathway for the seat to follow;
wherein the rear of the seat track is coupled to the rear arch;
wherein a midpoint of the seat track is coupled to the top of the seat support;
wherein the rear of the seat track is higher than the front of the seat track.

3. The exercise machine having integrated video gaming system according to claim 2
wherein the front housing covers mechanical components and the controller to prevent injuries and to protect equipment;
wherein the front housing is located at the front of the frame and is coupled to the front lateral frame bracket, the longitudinal frame bracket, or both.

4. The exercise machine having integrated video gaming system according to claim 3
wherein the seat is adapted for the user to sit on while exercising;
wherein the seat comprises a seat platform and a seat back;
wherein the seat is slidably coupled to the seat track via a seat carrier.

5. The exercise machine having integrated video gaming system according to claim 4
wherein the seat carrier is coupled to the bottom of the seat;
wherein the seat carrier slidably couples to the seat track such that the seat slides along the seat track but is prevented from falling off of the seat track.

6. The exercise machine having integrated video gaming system according to claim 5
wherein the pedals are adapted to be foot-operated levers adjacent to the left and right of the front housing;
wherein the pedals are coupled to a crank arm such that the pedals are moved in a circular manner.

7. The exercise machine having integrated video gaming system according to claim 6
wherein a brake within the front housing resists the motion of the pedals.

8. The exercise machine having integrated video gaming system according to claim 7
wherein the amount of resistance provided by the brake is variable and under control of the controller;
wherein the rotational position of the pedals is sensed by the controller.

9. The exercise machine having integrated video gaming system according to claim 8
wherein the steering assembly comprises a vertical steering post, a steering extension post, an elbow joint, and a steering wheel;
wherein the steering assembly is adapted to enhance upper body strength of the user while exercising.

10. The exercise machine having integrated video gaming system according to claim 9
wherein the vertical steering post is a vertical armature located at the front of the frame;
wherein the bottom of the vertical steering post is coupled to the front lateral frame bracket or to the longitudinal frame bracket;
wherein the top of the vertical steering post comprises the elbow joint.

11. The exercise machine having integrated video gaming system according to claim 10
wherein the steering extension post is a telescoping horizontal armature that is oriented to run from front to rear above the longitudinal frame bracket of the frame;
wherein the front end of the steering extension post is coupled to the elbow joint;
wherein the rear of the steering extension post is coupled to the steering wheel;
wherein the elbow joint is operable to allow up and down pivoting of the steering extension post.

12. The exercise machine having integrated video gaming system according to claim 11
wherein the steering extension post comprises an air shock;
wherein the air shock is a pneumatic shock absorber;
wherein the air shock allows the steering wheel to be moved in a forward direction as a forward force is applied to the steering wheel and returns the steering wheel to the original rearward position when the force is diminished.

13. The exercise machine having integrated video gaming system according to claim 12
wherein the steering wheel is a circular armature;
wherein the center of the steering wheel is pivotably coupled to the rear end of the steering extension post.

14. The exercise machine having integrated video gaming system according to claim 13
wherein the rotational position of the steering wheel is sensed by the controller.

15. The exercise machine having integrated video gaming system according to claim 14
wherein the display screen is a flat-screen video display located at the center of the steering wheel;
wherein the images presented on the display screen is sourced from the controller.

16. The exercise machine having integrated video gaming system according to claim 15
wherein the controller comprise a microprocessor and a memory;
wherein the memory stores instructions and data;
wherein the instructions cause the microprocessor to control the sequence and timing of the brake, the display screen, sensing the rotational position of the steering wheel, or combinations thereof.

17. The exercise machine having integrated video gaming system according to claim 16 wherein the instructions controls the sequence and timing of the exercise machine having integrated video gaming system such that the exercise machine having integrated video gaming system functions as the gaming system.

\* \* \* \* \*